(12) United States Patent
Barker

(10) Patent No.: US 9,556,878 B2
(45) Date of Patent: Jan. 31, 2017

(54) DEFOAMING SYSTEMS AND METHODS IN HYDROCARBON PROCESSES

(71) Applicant: Bechtel Hydrocarbon Technology Solutions, Inc., Houston, TX (US)

(72) Inventor: Craig T Barker, Bartlesville, OK (US)

(73) Assignee: Bechtel Hydrocarbon Technology Solutions Inc., Houston, TX (US)

( * ) Notice: Subject to any disclaimer, the term of this patent is extended or adjusted under 35 U.S.C. 154(b) by 0 days.

(21) Appl. No.: 14/657,385

(22) Filed: Mar. 13, 2015

(65) Prior Publication Data

US 2015/0184080 A1 Jul. 2, 2015

Related U.S. Application Data

(62) Division of application No. 14/370,463, filed as application No. PCT/US2012/024461 on Feb. 9, 2012.

(51) Int. Cl.

| | | |
|---|---|---|
| C10B 55/02 | (2006.01) | |
| C10B 57/06 | (2006.01) | |
| F04D 29/047 | (2006.01) | |
| B01D 19/04 | (2006.01) | |
| C10B 55/00 | (2006.01) | |
| C10B 57/12 | (2006.01) | |
| C10G 9/00 | (2006.01) | |
| C10G 33/04 | (2006.01) | |
| F04D 13/08 | (2006.01) | |

(52) U.S. Cl.
CPC ............. *F04D 29/047* (2013.01); *B01D 19/04* (2013.01); *C10B 55/00* (2013.01); *C10B 55/02* (2013.01); *C10B 57/06* (2013.01); *C10B 57/12* (2013.01); *C10G 9/005* (2013.01); *C10G 33/04* (2013.01); *F04D 13/08* (2013.01)

(58) Field of Classification Search
CPC .................................. C10B 55/02; C10B 57/06
See application file for complete search history.

(56) References Cited

U.S. PATENT DOCUMENTS 4,082,690 A * 4/1978 Farminer ........... B01D 19/0409
516/123
5,169,560 A * 12/1992 Hart .................... B01D 19/0422
516/126

FOREIGN PATENT DOCUMENTS

CN 1530377 A 9/2004

OTHER PUBLICATIONS

S. Iijima, Helical Microtubules of Graphitic Carbon, 354 Nature 56-58 (1991).*
Taiwan Patent Office, Office Action and Search Report of the Intellectual Property Office, Taiwan Patent Application No. 102105662, Apr. 15, 2016, 9 pages, Intellectual Property Office, Taiwan.
Lee and Li Attorneys-at-Law, Response to Office Action, Taiwan Patent Application No. 102105662, Jul. 2016, 2 pages, Taipei, Taiwan.

* cited by examiner

*Primary Examiner* — Randy Boyer
(74) *Attorney, Agent, or Firm* — Crain, Caton & James

(57) ABSTRACT

Methods for defoaming in hydrocarbon processes include the steps of providing a defoaming agent, and introducing the agent into a hydrocarbon process to inhibit or control foaming in the hydrocarbon process. These methods may be particularly useful in coking processes, especially as to foaming in coke drums. In certain embodiments, defoaming agents may comprise a plurality of carbon nanoparticles. In some embodiments, drag reducing agents may comprise high-molecular weight alkanes. Advantages include, but are not limited to, more efficient and effective foam inhibition, reduced or eliminated product contamination, reduced or eliminated catalyst poisoning, increased refinery production rate, debottlenecking the coker, and reduced cost and consequences of applying too much antifoam.

13 Claims, 1 Drawing Sheet

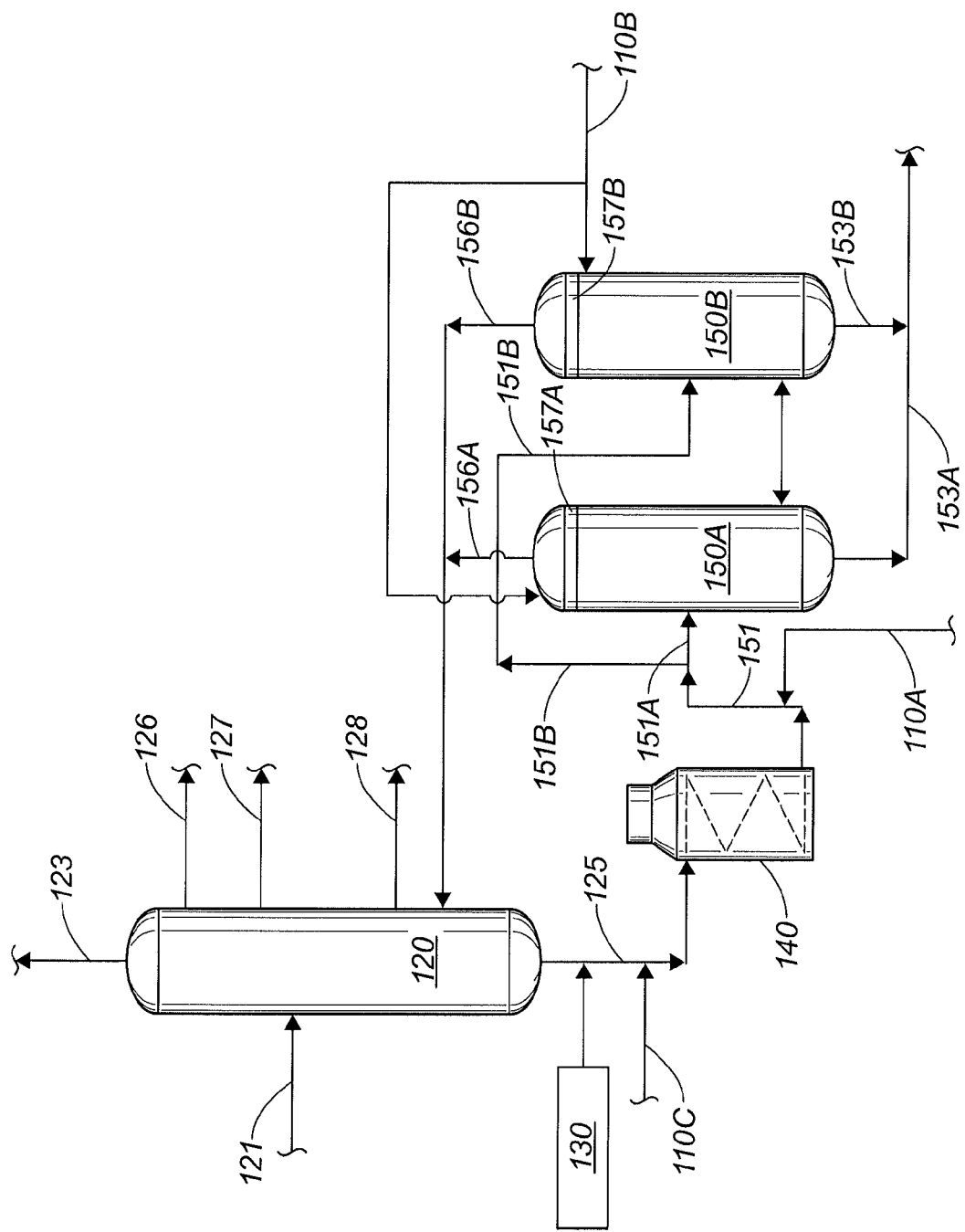

DEFOAMING SYSTEMS AND METHODS IN HYDROCARBON PROCESSES

CROSS-REFERENCE TO RELATED APPLICATIONS

This application is a divisional of U.S. patent application Ser. No. 14/370,463, filed on Jul. 2, 2014, which claims the priority of PCT Patent Application Serial No. PCT/US12/24461, filed on Feb. 9, 2012, and which are incorporated herein by reference.

STATEMENT REGARDING FEDERALLY SPONSORED RESEARCH

Not applicable.

FIELD OF THE INVENTION

The present invention generally relates to systems and methods for defoaming in hydrocarbon processes. More particularly, the present invention related to inhibiting or controlling foaming in hydrocarbon processes.

BACKGROUND OF THE INVENTION

Foaming in hydrocarbon processes is usually undesirable as foaming typically adversely affects hydrocarbon process efficiencies. One example of a hydrocarbon process that can be acutely affected by undesirable foaming is coking.

Coking is one of the older refining processes. The purpose of a coke plant is to convert heavy residual oils (e.g. tar, asphalt, etc.) into lighter, more valuable motor fuel blending stocks. Refinery coking is controlled, severe, thermal cracking. It is a process in which the high molecular weight hydrocarbon residue (normally from the bottoms of the vacuum flasher in a refinery crude unit) are cracked or broken up into smaller and more valuable hydrocarbons.

Coking is accomplished by subjecting the feed charge to an extreme temperature of approximately 950° F. that initiates the cracking process. The light hydrocarbons formed as a result of the cracking process flash off and are separated in conventional fractionating equipment. The material that is left behind after cracking is coke, which is almost pure carbon. In addition to coke, which is of value in the metal industry in the manufacture of electrodes, fuel coke, titanium dioxide, etc., the products of a coke plant include gas (refinery fuel and LPG), unstabilized (wild) gasoline, light gas oil, and heavy gas oil.

The lion's share of the world's coking capacity is represented by delayed coking processes. Delayed coking can be thought of as a continuous batch reaction. The process makes use of paired coke drums. One drum (the active drum) is used as a reaction vessel for the thermal cracking of residual oils. This active drum slowly fills with coke as the cracking process proceeds. While the active drum is being filled with coke, a second drum (the inactive drum) is in the process of having coke removed from it. The coke drums are sized so that by the time the active drum is filled with coke, the inactive drum is empty. The process flow is then switched to the empty drum, which becomes the active drum. The full drum becomes the inactive drum and is emptied or decoked. By switching the process flow back and forth between the two drums in this way, the coking operation can continue uninterrupted.

After being heated in a direct-fired furnace, the oil is charged to the bottom of the active coke drum. The cracked light hydrocarbons rise to the top of the drum where they are removed and charged to a fractionator for separation. The heavier hydrocarbons are left behind, and the retained heat causes them to crack to coke.

One problem frequently encountered in coke production is foaming in the coke drums. In coking processes, foam formation is the result of evolved gas molecules in a liquid. Foaming is a function of many variables including surface tension, pressure, viscosity, and other properties of the gas/liquid system. While foaming in aqueous systems has been studied extensively, relatively little is known about controlling foaming in organic systems. This foaming problem is particularly acute in the later portions of a fill cycle or when a coke drum is depressured before coking is completed. Foaming is especially problematic because of the possibility of carry-over which can result in plugged overhead lines and lost profit opportunity to clean the lines. Foaming in coke drums also reduces the useable space in the drums for coke capacity, ultimately limiting total production capacity.

Conventional approaches for addressing foaming in coke drums suffer from a variety of significant disadvantages. One approach for dealing with foaming is to simply decrease production rates to limit foaming. This approach is obviously disadvantageous in that overall production is reduced. The temperature can also be increased, but this shortens the run length of the coker furnace because the fouling rate increases in the furnace tubes, unfortunately resulting in more frequent downtime to clean the furnace tubes.

Other approaches include injecting a silicone-based compound (e.g. polydimethylsiloxane compounds) to reduce foaming. These silicon-based compounds when used in excess have been known to poison downstream hydrotreating catalysts. Catalyst poisoning is a severe problem as the catalyst cannot be regenerated. Indeed, poisoned catalyst must be replaced offline, which requires a costly shutdown of the hydrotreating facility as well as possibly other units in the refinery. The initial silicon-based compounds are known to decompose and lose effectiveness over time, thus limiting their effectiveness and resulting in waste due to the required constant addition of the compounds during key portions of the coking cycle.

The problem of foaming in coke drums can be detected if appropriate indicators are available. By the time foaming is detected, however, it may be too late to prevent undesirable carryover or plugging of overhead lines if action is not taken quickly.

SUMMARY

The present invention therefore, meets the above needs and overcomes one or more of the deficiencies in the prior art by inhibiting or controlling foaming in hydrocarbon processes.

SUMMARY OF THE INVENTION

In one embodiment, the present invention includes a method for defoaming in a coking process comprising the steps of: i) providing a defoaming agent wherein the defoaming agent consists of a plurality of carbon nanoparticles; ii) introducing the defoaming agent into the coking process; iii) detecting a presence of foaming in one or more coke drums using a level indicator; and iv) introducing an effective amount of the defoaming agent into the coking process wherein the effective amount is determined as comprising an amount of carbon nanoparticles required to substantially inhibit foaming in the one or more coke drums.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which:

FIG. 1 illustrates a coking process in accordance with the present invention.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present invention may be applied in the oil and gas industry with cokers, it is not limited thereto and may also be applied in the oil and gas industry with regard to oil and gas production where foaming is an issue, as well as in other industries to achieve similar results.

Methods for defoaming in a hydrocarbon processes comprise the steps of providing a defoaming agent, and introducing the agent into a hydrocarbon process to inhibit or control foaming in the hydrocarbon process. The methods disclosed herein may be particularly useful as applied to coking processes, especially as to foaming in coke drums. For convenience of reference, the term, "defoaming agent," as used herein, refers to both defoaming agents and antifoaming agents, which either reduce existing foam or prevent foam initiation in the first place.

In certain embodiments, defoaming agents may comprise a plurality of carbon nanoparticles. In some embodiments, drag reducing agents may comprise high-molecular weight alkanes. Other optional embodiments and features are described in more detail below.

Advantages of methods of the present invention, include, but are not limited to, more efficient and effective foam inhibition, reduced or eliminated product contamination, reduced or eliminated catalyst poisoning, increased refinery production rate, debottlenecking the coker, and reduced cost and consequences of applying too much antifoam.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

FIG. 1 illustrates one example of a flow diagram of a portion of a coking process in accordance with one embodiment of the present invention. Delayed coking process 100 generally comprises fractionator 120, coker furnace 140, and coke drums 150A and 150B. Coking process 100 begins with refinery heavies 121 being fed to fractionator 120.

Light gases are removed overhead from fractionator 120 through overhead line 123. Heavier materials, such as gasoline, light gas oil, and heavy gas oil are taken from fractionator 120 through lines 126, 127, and 128, respectively. LCGO or HCGO can be mixed with the feed stream 121 to reduce the viscosity of the mixture to permit easier handling and pumping of the mixture to the delayed coking part of the process. The diluent heavy gas oil which is part of the gaseous effluent from the coke drums does not substantially coke on its second pass through the coker and therefore recycles through the system, keeping the viscosity lower than it otherwise would have been.

All or some portion of the mixture of residual oil and heavy gas oil leaving fractionator 120 through line 125 is introduced to coker furnace 140. Typically, this mixture of reduced crude oil and heavy gas oil is heated in coker furnace 140 to temperatures in the range of about 875° F. to about 975° F. at pressures of about atmospheric to about 250 psig. The heated mixture of reduced crude oil and heavy gas oil leaving coker furnace 140 and the total mixture is then passed via lines 151, 151A, and 151B as a feed to coke drums 150A or 150B. Coke drums 150A and 150B operate on alternate coking and decoking cycles of from about 8 to about 100 hours. While one drum is being filled with coke, the other drum is being decoked.

The overhead vapor from the coke drums is passed by lines 156A or 156B to fractionator 120, wherein it is separated into various fractions as previously described. The green coke which is removed from the coke drums through outlets 153A and 153B is further processed (not shown) to produce calcined coke.

Although many variations of this coking process 100 are possible, this type of operation is typical of a commercial unit. This illustration is merely illustrative of coking processes and is not intended to be limiting.

As described above, a challenge frequently faced in coking processes is foaming, particularly in one or more of the coke drums. In certain embodiments, a defoaming agent may be introduced into the coking process, for example, by way of line 110A for combination with the coke feed in first heated diluent line 151. Although the defoaming agent may be introduced at any point upstream of coke drums 150A and 150B, another example of an alternative injection point includes lines 110B for introducing the defoaming agent into coke drums 150A and 150B. It could also be added upstream of coker furnace 140 at line 110C if it would not unduly degrade or cause substantial fouling in coker furnace 140.

In some embodiments, the defoaming agent comprises a plurality of carbon nanoparticles, but may be sub-micron particles. One advantage of using carbon nanoparticles is that any carbon nanoparticles remaining in the coke product will not adversely affect the product. The carbon nanoparticles may range in any size effective to reduce foam in a coking process and may be of any one or more of various shapes, including nanofibers, single wall nanotubes, multi-wall nanotubes, regular-shaped particles, irregular-shaped particles or graphene. Examples of suitable size ranges of the carbon nanoparticles includes particles with a diameter of less than 100 nanometers. The amount of carbon nanoparticles added to the coking process may be from about 10 parts per million by weight (ppmw) to about 2000 ppmw of carbon nanoparticles relative to coker feed.

The defoaming agent is thought to work by attacking the gas/liquid interface and lowering the liquid surface tension.

The defoaming agent may be dissolved or dispersed in a carrier fluid to facilitate transport of the defoaming agent as a liquid defoaming agent. Preferred carrier fluids comprise any fluid that is compatible with the coking process and that does not adversely chemically interact with the defoaming agent. Examples of suitable carrier fluids comprise kerosene, gasoline, light coker gas oil, heavy coker gas oil, light cycle oil, or any combination thereof. Alternatively, the carrier fluid may be a hydrocarbon having a boiling point less than about 1,000° F.

The defoaming agent, or liquid defoaming agent, may be introduced continuously, batchwise, or semi-batch into the coking process as desired. In certain embodiments, the defoaming agent is introduced during a last half of the fill cycle about an hour before foaming is expected to reach a high level in the coke drum. If desired, foam detection devices 157A, 157B may be installed in coke drums 150A and 150B to detect foaming. In this way, detection of foam may indicate the need for additional defoaming agent. Examples of foam detecting instruments include, but are not limited to, level indicating devices such as nuclear level gauges using gamma radiation, radar gauges, or any other non-intrusive level gauge that would not be subject to plugging with solid coke. In operation, an effective amount of carbon nanoparticles, the amount of carbon nanoparticles required to substantially inhibit foaming in the one or more coke drums, may then be introduced into the coking process.

Where the defoaming agent comprises carbon nanoparticles, the carbon nanoparticles may be formed in the shape of platelets, shavings, fibers, flakes, ribbons, rods, strips, spheroids, hollow beads, toroids, pellets, tablets, or any combination thereof.

In certain embodiments, the defoaming agent is substantially free of any component that adversely affects the coke product or that adversely affects any downstream refinery catalyst such as a hydrotreating or reforming catalyst. Examples of components which may adversely affect the final coke product or downstream refinery catalysts include without limitation silicone-based components such as polydimethylsiloxane compounds and finely divided solids. Thus, the defoaming agent may be free of any silicone-based compounds. In other embodiments, however, the defoaming agent may be combined with conventional silicon-based compounds such that the combination benefits from the use of both types of components. Additionally, the defoaming agent may be selected to be free of any component capable of substantially changing the physical properties of any coke produced by the coking process or may be selected to be free of any component capable of chemically interacting with a hydrotreater catalyst so as to poison the hydrotreater catalyst.

In certain embodiments, the defoaming agent may comprise a drag reducing agent, which serves as a flow improver. The drag reducing agent may comprise any long linear alkane, including, but not limited to, substantially linear high-molecular weight poly alpha olefins or poly methacrylate with molecular weights ranging from about 1,000 to about 2,000,000 atomic mass units (AMUs) and from about 1,000 to about 10,000,000 AMUs.

In certain embodiments, the defoaming agent may comprise both a plurality of carbon nanoparticles and a drag reducing agent. Other optional components that may be included in the defoaming agent include, but are not limited to, kerosene, light coker gas oil, heavy coker gas oil, light cycle oil, diesel, vacuum gas oil, silicon antifoams, and other non-silicon antifoams.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

What is claimed is:

1. A method for defoaming in a coking process comprising the steps of:
   providing a defoaming agent wherein the defoaming agent consists of a plurality of carbon nanoparticles;
   introducing the defoaming agent into the coking process;
   detecting a presence of foaming in one or more coke drums using a level indicator; and
   introducing an effective amount of the defoaming agent into the coking process wherein the effective amount is determined as comprising an amount of carbon nanoparticles required to substantially inhibit foaming in the one or more coke drums.

2. The method of claim 1 further comprising the steps of:
   providing a carrier fluid within which the defoaming agent is dissolved or dispersed to form a liquid defoaming agent; and
   introducing the liquid defoaming agent into the coking process.

3. The method of claim 2 wherein the carrier fluid comprises at least one of kerosene, light coker gas oil, heavy coker gas oil, light cycle oil and gasoline.

4. The method of claim 2 wherein the carrier fluid is a hydrocarbon having a boiling point less than about 1,000° F.

5. The method of claim 1 wherein the defoaming agent is introduced into a feed to one or more coke drums to control foaming in the one or more coke drums.

6. The method of claim 1 wherein the defoaming agent is introduced into one or more coke drums to control foaming in the one or more coke drums.

7. The method of claim 1 wherein the amount of carbon nanoparticles is from about 10 parts per million by weight (ppmw) to 2000 ppmw of carbon nanoparticles relative to a coker feed.

8. The method of claim 1 further comprising the step of continuously introducing the defoaming agent into the coking process.

9. The method of claim 1 further comprising the step of continuously introducing the defoaming agent into the coking process during a last half of a fill cycle of a coke drum.

10. The method of claim 1 wherein the carbon nanoparticles are formed in the shape of at least one of platelets, shavings, fibers, flakes, ribbons, rods, strips, spheroids, hollow beads, toroids, pellets and tablets.

11. The method of claim 1 wherein the defoaming agent further comprises no silicone-based compounds.

12. The method of claim 1 wherein the defoaming agent further comprises no component capable of chemically interacting with a hydrotreater catalyst.

13. The method of claim 1 further comprising the steps of:
   continuously introducing the defoaming agent into the coking process during a last half of a fill cycle of a coke drum; and wherein the defoaming agent further comprises no component capable of chemically interacting with a hydrotreater catalyst.

\* \* \* \* \*